US011032772B2

(12) United States Patent
Elsayed et al.

(10) Patent No.: US 11,032,772 B2
(45) Date of Patent: *Jun. 8, 2021

(54) LOW-POWER LTE (LP-LTE) PAGING-MONITORING (71) Applicant: Apple Inc., Cupertino, CA (US)

(72) Inventors: Moustafa M. Elsayed, Los Gatos, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,039

(22) Filed: Jun. 4, 2020

(65) Prior Publication Data

US 2020/0305081 A1   Sep. 24, 2020

Related U.S. Application Data (63) Continuation of application No. 16/444,004, filed on Jun. 18, 2019, now Pat. No. 10,701,635, which is a
(Continued)

(51) Int. Cl.
*H04W 52/02* (2009.01)
*H04W 68/00* (2009.01)
*H04W 76/28* (2018.01)

(52) U.S. Cl.
CPC ........ *H04W 52/0229* (2013.01); *H04W 68/00* (2013.01); *H04W 76/28* (2018.02); *Y02D 30/70* (2020.08)

(58) Field of Classification Search
None
See application file for complete search history.

(56) References Cited

U.S. PATENT DOCUMENTS

| 5,594,782 A | 1/1997 | Zicker |
| 7,305,259 B1 | 12/2007 | Malone |

(Continued)

FOREIGN PATENT DOCUMENTS

| EP | 2 903 354 A1 | 8/2015 | |
| WO | WO-2008049220 A1 * | 5/2008 | ............ H04W 48/16 |
| WO | WO-2014101028 A1 * | 7/2014 | ............ H04W 48/16 |

OTHER PUBLICATIONS

Kini, Ananth V., et al.; "A Dynamic Subframe Set Power Control Scheme for Interference Mitigation in Reconfigurable TD-LTE Systems"; 23rd Wireless and Optical Communication Conference (WOCC); May 9-10, 2014; 6 pages.
(Continued)

*Primary Examiner* — Mohammed Rachedine
(74) *Attorney, Agent, or Firm* — Kowert, Hood, Munyon, Rankin & Goetzel, P.C.

(57) ABSTRACT

A wireless communication device (UE) may include a paging subsystem that performs paging-monitoring as part of wireless communications of the wireless communication device. The UE may place wireless communication system resources not required during paging-monitoring into either a low-power state or a power-down state, and those system resources may remain in one of those respective states during paging-monitoring. The wireless communication system resources not required during the paging-monitoring may include at least a wireless communications protocol stack used during the wireless communications of the UE, and at least system resources used for performing uplink related tasks independently of wireless communication system resources used for performing downlink related tasks. The paging subsystem may include at least a control manager subsystem capable of decoding a physical downlink control channel, a downlink control subsystem capable of
(Continued)

performing tasks related to a physical downlink data channel, and a message parser for parsing paging messages.

20 Claims, 8 Drawing Sheets

Related U.S. Application Data continuation of application No. 15/274,970, filed on Sep. 23, 2016, now Pat. No. 10,341,952.

(60) Provisional application No. 62/307,772, filed on Mar. 14, 2016.

(56) References Cited

U.S. PATENT DOCUMENTS

| | | | |
|---|---|---|---|
| 9,504,059 B2 | 11/2016 | Belghoul et al. | |
| 9,839,001 B2* | 12/2017 | Choi | H04W 68/02 |
| 10,341,952 B2 | 7/2019 | Moustafa et al. | |
| 2005/0105369 A1 | 5/2005 | Schoenfeld | |
| 2005/0118981 A1 | 6/2005 | Laroia et al. | |
| 2006/0187862 A1 | 8/2006 | Lee et al. | |
| 2008/0310485 A1 | 12/2008 | Soliman | |
| 2009/0253448 A1 | 10/2009 | Kwon | |
| 2009/0290561 A1 | 11/2009 | Kleindl | |
| 2010/0077244 A1* | 3/2010 | Nowak | G06F 1/3203 713/324 |
| 2010/0136928 A1 | 6/2010 | Rofougaran | |
| 2011/0003609 A1 | 1/2011 | Sundstrom et al. | |
| 2011/0280133 A1 | 11/2011 | Chang et al. | |
| 2013/0040666 A1 | 2/2013 | Chin et al. | |
| 2013/0157590 A1 | 6/2013 | Mo | |
| 2013/0242818 A1 | 9/2013 | Heo | |
| 2014/0153460 A1 | 6/2014 | Shrivastava | |
| 2014/0362728 A1 | 12/2014 | Krochmal | |
| 2014/0364118 A1 | 12/2014 | Belghoul et al. | |
| 2015/0011157 A1 | 1/2015 | Terry | |
| 2015/0092645 A1 | 4/2015 | Tabet et al. | |
| 2015/0271769 A1 | 9/2015 | Bharadwaj | |
| 2015/0282045 A1 | 10/2015 | Salem | |
| 2015/0351032 A1 | 12/2015 | Homchaudhuri | |
| 2016/0197736 A1 | 7/2016 | Shvarzberg | |
| 2016/0234718 A1 | 8/2016 | Thangarasa et al. | |
| 2016/0270118 A1 | 9/2016 | He | |
| 2016/0294942 A1 | 10/2016 | Tembey | |
| 2016/0295637 A1 | 10/2016 | Bergquist | |
| 2017/0013630 A1 | 1/2017 | Franz et al. | |
| 2017/0150477 A1* | 5/2017 | Du | H04W 8/02 |
| 2017/0366363 A1* | 12/2017 | Hong | H04L 12/189 |
| 2018/0270634 A1* | 9/2018 | Kim | H04W 28/065 |

OTHER PUBLICATIONS

International Search Report and Written Opinion, Application No. PCT/US2017/013668, dated Apr. 6, 2017, 13 pages.

* cited by examiner

LOW-POWER LTE (LP-LTE) PAGING-MONITORING

PRIORITY CLAIM

This application is a continuation of U.S. patent application Ser. No. 16/444,004 titled "Low-power LTE (LP-LTE) Paging Monitoring", filed on Jun. 18, 2019, which is a continuation of U.S. patent application Ser. No. 15/274,970 titled "Low-power LTE (LP-LTE) Paging Monitoring", filed on Sep. 23, 2016 and claiming benefit of priority of U.S. Provisional Patent Application Ser. No. 62/307,772 titled "Low-power LTE (LP-LTE) Paging Monitoring", filed on Mar. 14, 2016, all of which are hereby incorporated by reference in their entirety as though fully and completely set forth herein.

FIELD OF THE INVENTION

The present application relates to wireless communications, and more particularly to low-power paging-monitoring during wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices used in wireless cellular communications, e.g., through wireless devices such as cellular phones, wearable wireless communication devices (e.g. a smart watch), base stations and relay stations, just to name a few. In addition, wireless communication technologies, such as cellular communication technologies, are substantially designed to provide mobile communication capabilities to wireless devices generally powered by a portable power supply, e.g., a battery. Batteries hold a finite charge, and so in order to improve battery life of wireless devices, one approach is to reduce power consumption required to perform wireless communications. Accordingly, some wireless communication technologies implement features designed to conserve power while still providing a high-quality user experience. However, increasing the functionality of a UE device can place a significant strain on the battery life of the UE device. Thus it is very important to also reduce power requirements in UE device designs while allowing the UE device to maintain good transmit and receive abilities for improved communications.

Other corresponding issues related to the prior art will become apparent to one skilled in the art after comparing such prior art with the disclosed embodiments as described herein.

SUMMARY OF THE INVENTION

Embodiments are presented herein of, inter alia, of methods for performing paging-monitoring during wireless communications while conserving considerable amount of power. Embodiments are further presented herein for wireless communication systems containing wireless communication devices or user equipment (UE) devices and/or accessory devices and/or wearable devices and/or base stations communicating with each other within the wireless communication systems.

In some embodiments, an apparatus for use in wireless communications, for example a cellular controller for facilitating cellular communications of a wireless communication device, may include a paging subsystem that performs paging monitoring as part of the wireless communications of the wireless communication device. When the wireless communication device enters idle mode, the apparatus may place at least those wireless communication system resources that are not required during the paging monitoring into either a low-power state or a power-down state. Subsequently, if the wireless communication system resources not required during the paging monitoring were placed in a low-power state, they may remain in the low-power state until the paging subsystem activates them. Similarly, if the wireless communication system resources not required during the paging monitoring were placed in a power-down state, they may remain in the power down state until the paging subsystem activates them.

In some embodiments, an apparatus for use in wireless communications, for example a cellular controller for facilitating cellular communications of a wireless communication device, may include a paging subsystem that performs paging-monitoring as part of the wireless communications of the wireless communication device. The apparatus may place wireless communication system resources that are not required/used during paging-monitoring into either a low-power state or a power-down state, and those system resources may remain in one of those respective states even during paging-monitoring.

The wireless communication system resources not used/required during the paging-monitoring may include at least wireless communication system resources that perform uplink related tasks orthogonal to or disjointed from wireless communication system resources that perform downlink related tasks. Thus, the paging subsystem may include at least a control manager subsystem capable of decoding a physical downlink control channel, and a downlink control subsystem that performs tasks related to a physical downlink data channel. The downlink control subsystem may include a message parser capable of parsing paging messages. In some embodiments, the paging subsystem may also include one or more of a respective portion of shared memory used for inter-processor communication, a respective portion of scratch memory used for processing, a respective portion of code and data memory used by processing core elements of the wireless communication device that are not part of the wireless communication system resources, a respective portion of scratch memory used by hardware modules, and/or a respective portion of registers and memory used by the hardware modules.

When placing the wireless communication system resources not required during the paging-monitoring into the low-power state, the apparatus may set memory voltages for memories in the wireless communication system resources not required during paging-monitoring to levels below operating voltage levels, and/or decrease a clock frequency of operating clocks of processing elements in the wireless communication system resources not required during paging-monitoring. Prior to placing the wireless communication system resources not required during the paging-monitoring into the power-down state, the apparatus may first save a present state of the wireless communication system resources not required during the paging-monitoring into a non-volatile memory element.

Once the wireless communication system resources not required/used during the paging-monitoring have been placed into either the low-power state or the power-down state, the paging subsystem may process a physical downlink control channel and determine if the physical downlink control channel indicates paging. In response to determining that the physical downlink control channel indicates paging, the paging subsystem may process a physical downlink data channel, and determine if the paging includes paging assigned to the wireless communication device. In at least some embodiments, the paging subsystem includes a control manager subsystem to process the physical downlink control channel and determine if the physical downlink control channel indicates paging, and further includes a downlink control subsystem orthogonal to the control manager subsystem to process the physical downlink data channel and determine if the paging includes paging assigned to the wireless communication device.

In response to determining that the paging includes paging assigned to the wireless communication device, the paging subsystem may perform one of the following depending on whether the wireless communication system resources not required during the paging-monitoring had been previously placed in a low-power state or a power-down state. In case the system resources in question had been placed into the low-power state, the paging subsystem may place those system resources (namely, the wireless communication system resources not required during the paging-monitoring) into normal operating mode. In case the system resources in question had been placed into the power-down state, the paging subsystem may restore, to system memory, a previously stored system state of those system resources (namely, the wireless communication system resources not required during the paging-monitoring), and restore, to system memory, code associated with the wireless communication system resources not required during the paging-monitoring.

Furthermore, in response to determining that the paging does not include paging assigned to the wireless communication device, the paging subsystem may enter a discontinuous reception off-mode of operation. Similarly, in response to determining that the physical downlink control channel does not indicate paging, the paging subsystem may enter a discontinuous reception off-mode of operation.

In some embodiments, a wireless communication device includes radio frequency (RF) circuitry for performing RF communications, a control module configured to handle control communications according to a wireless communication technology, wherein the control module is coupled to the RF circuitry, a downlink module configured to handle downlink data communications according to the wireless communication technology, and an uplink module configured to handle uplink data communications according to the wireless communication technology. The radio, the control module, the downlink module, and the uplink module may be communicatively coupled, and the wireless communication device may perform paging-monitoring, where during paging-monitoring at least the protocol stack (with all its memory systems) and/or the uplink module (with all its subsystems and associated circuitry) is in either a low-power state or a power-down state. It should be noted that a major contributor for power consumption is the protocol stack with relatively substantial memory. Thus, a message parser (e.g. full ASN1 parser) may be included in the downlink module, thereby allowing for the protocol stack to be placed in either a low-power mode or a power-down mode during paging-monitoring, and remain in that mode until/unless activated by the paging subsystem.

In some embodiments, an apparatus for use in wireless communications may include a control manager module that includes a control manager processor and an associated control hardware subsystem coupled to the control manager processor. The apparatus may further include an uplink manager module that includes an uplink manager processor and an associated uplink hardware subsystem coupled to the uplink manager processor. The uplink manager module, which may be coupled to the control manager module, may be used in performing wireless uplink communications. The apparatus may also include a downlink manager module that includes a downlink manager processor and an associated downlink hardware subsystem coupled to the downlink manager processor. The downlink manager module, which may be coupled to the control manager module, may be used in performing wireless downlink communications. Finally, the apparatus may include a port coupled to the control manager module for coupling to radio frequency (RF) communication circuitry. The apparatus may use the control manager module, the downlink manager module and the RF communication circuitry but not use the uplink manager module during paging-monitoring.

In some embodiments, an apparatus for use in wireless communications may include a paging subsystem that performs paging-monitoring as part of wireless communications of a wireless communication device. When the wireless communication device enters idle mode, the apparatus may place at least those wireless communication system resources that are not required during the paging-monitoring into either a low-power state or a power-down state. When in low-power state during paging-monitoring, the wireless communication system resources not required during the paging-monitoring may remain in the low-power state until the paging subsystem activates them. Similarly, when in the power-down state during paging-monitoring, the wireless communication system resources not required during the paging-monitoring may remain in the power-down state until the paging subsystem activates them.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
DL: Downlink (from BS to UE)
UL: Uplink (from UE to BS)
FDD: Frequency Division Duplexing
TDD: Time Division Duplexing
LTE: Long Term Evolution
TX: Transmission/Transmit
RX: Reception/Receive
RAT: Radio Access Technology
PDU: Protocol Data Unit
DRX: Discontinuous Reception
PDCCH: Physical Downlink Control Channel
PDSCH: Physical Downlink Shared Channel
RNTI: Radio Network Temporary Identifier
IMSI: International Mobile Subscriber Identity
RRC: Radio Resource Control
MAC: Media Access Control (layer)
PDCP: Packet Data Convergence Protocol
TCP/IP: Transmission Control Protocol/Internet Protocol
RLC: Radio Link Control
NAS: Non-Access Stratum
PUCCH: Physical Uplink Control Channel
PUSCH: Physical Uplink Shared Channel
IPC: Inter-Processor Communication
HARQ: Hybrid Automatic Repeat Request

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which may be mobile or portable and which perform wireless communications. In general, such devices may also be referred to as wireless communication devices. Examples of UE devices include mobile telephones or smart phones (e.g., iPhone™, Android™-based phones) and tablet computers such as iPad™, Samsung Galaxy™, etc., portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of electronic devices, e.g. computer system devices, which perform wireless communications such as wireless local area network (WLAN) communications, cellular communications according to one or more of a number of different cellular radio access technologies, Wi-Fi communications, and the like. The wireless communication device may wirelessly communicate through one or more respective radio frequency (RF) interfaces that facilitate such communications. As used herein, the term "wireless communication device" may refer to a UE device, as defined above, or to a stationary device, such as a stationary wireless client or a wireless base station. For example a wireless device may be any type of wireless station of an IEEE 802.11 system, such as an access point (AP) or a client station, or any type of wireless station of a cellular communication system communicating according to one or more cellular radio access technologies (e.g. LTE, CDMA, GSM), such as a base station (or cellular tower) or a cellular telephone, for example. A wireless device may communicate according to multiple different radio access technologies, for example over multiple RF interfaces.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
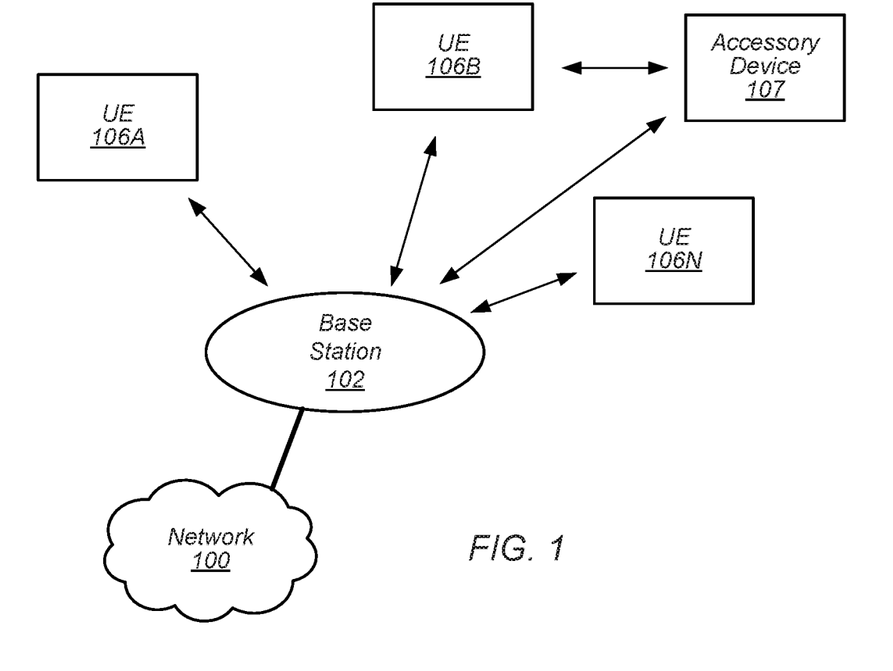
FIG. 1 illustrates an exemplary (and simplified) wireless communication system, according to some embodiments.
Figure 2:
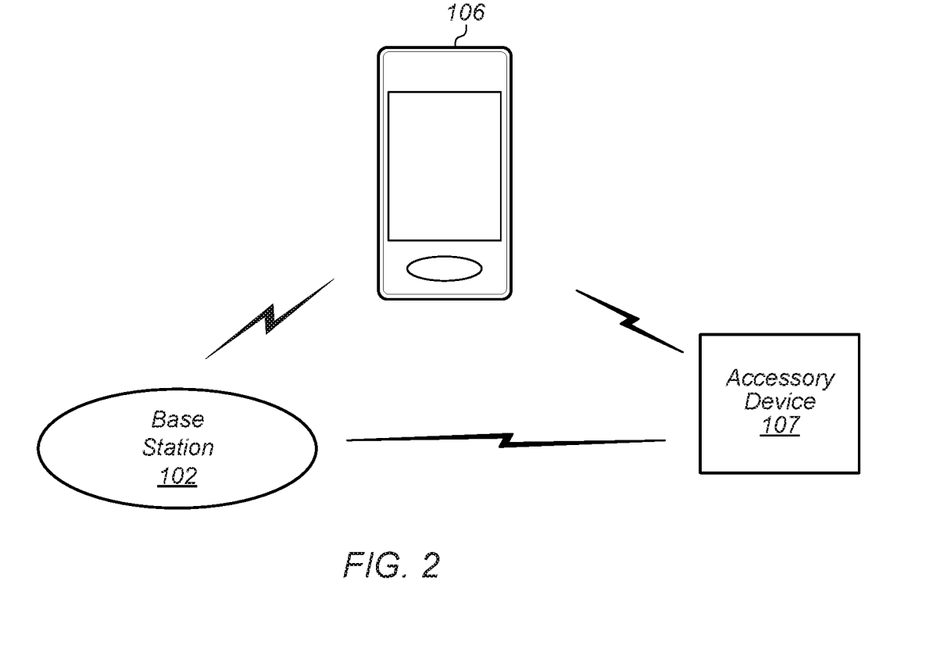
FIG. 2 illustrates an exemplary base station in communication with an exemplary wireless user equipment (UE) device and an exemplary accessory device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N and accessory device 107. Each of the user devices and the accessory device may be referred to herein as a "user equipment" (UE) or UE device. Thus, the user devices 106 are referred to as UEs or UE devices. For the purposes of this disclosure, accessory device 107 may also be considered a UE device.

The base station 102 may be a base transceiver station (BTS) or cell site, and may include hardware that enables wireless communication with the UEs 106A through 106N and with accessory device 107. Accessory device 107 may also communicate directly with a UE device, e.g. with UE device 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 3GPP2 CDMA2000 (e.g., 1xRTT, 1xEV-DO, HRPD, eHRPD), Wi-Fi, WiMAX etc. In some embodiments, the base station 102 communicates with at least one UE/accessory device that performs paging-monitoring as described herein.

UE 106/107 may be capable of communicating using multiple wireless communication standards. For example, a UE 106/107 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106/107 may be configured to operate with reduced power consumption, at least according to the various methods of paging monitoring as described herein. Base station 102 and other similar base stations operating according to the same or a different cellular communication standard may thus be provided as one or more networks of cells, which may provide continuous or nearly continuous overlapping service to UE 106/107 and similar devices over a wide geographic area via one or more cellular communication standards.

The UE 106/107 might also or alternatively be configured to communicate using WLAN, BLUETOOTH', one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) and accessory device 107 in communication with the base station 102, according to some embodiments. Accessory device 107 may also communicate with UE device 106. The UE 106 may be a device with wireless network connectivity such as a mobile phone, a hand-held device, a computer or a tablet, or virtually any type of wireless device. Similarly, accessory device may be a device with wireless network connectivity such as headphones, smart watch, smart glasses, and the like. The UE 106 and/or accessory device 107 may perform any of the method embodiments of paging-monitoring described herein. The UE 106 and accessory device 107 may be configured to communicate using any of multiple wireless communication protocols. For example, the UE 106 may be configured to communicate using any one or more of CDMA2000, LTE, LTE-A, WLAN, or GNSS. Accessory device may be configured to communicate using any one or more of WLAN, BLUETOOTH™, Wi-Fi, and/or any cellular radio access technologies. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1xRTT, and separate radios for communicating using each of Wi-Fi and BLUETOOTH™. Other configurations are also possible.

Figure 3:
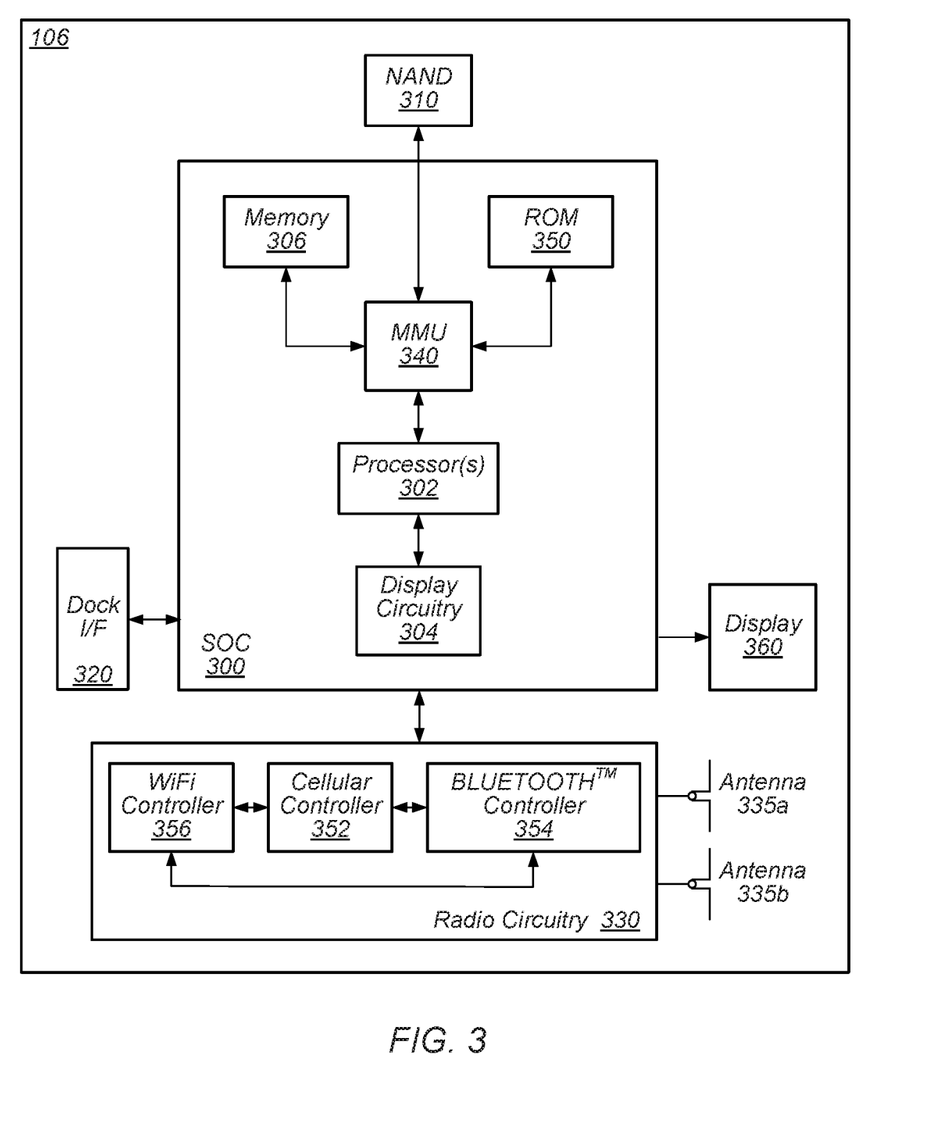
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include one or more processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector OF 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other wireless communication devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for low-power paging-monitoring, e.g. low-power LTE paging-monitoring. Thus, in some embodiments, UE 106 may include a novel and improved cellular controller 352 that facilitates low-power LTE paging-monitoring. The processor(s) 302 of the UE device 106 and various other components within UE 106 may also be incorporated into UE 106 to implement part or all of the methods of low-power paging-monitoring described herein. For example, processor(s) 302 may execute program instructions stored on a memory medium (e.g., a non-transitory computer-readable memory medium). In other embodiments, processor(s) 302 and/or at least certain portions of radio circuitry 330 may be configured as programmable hardware elements, such as FPGAs (Field Programmable Gate Arrays), or as ASICs (Application Specific Integrated Circuits) or as various dedicated circuits, or any number of combinations thereof. Furthermore, processor(s) 302 may be coupled to and/or may interoperate with other components, such as cellular controller 352 as shown in FIG. 3, to implement communications by UE 106 that incorporate low-power LTE paging-monitoring by UE 106 according to various embodiments disclosed herein. Processor(s) 302 may also implement various other applications and/or end-user applications running on UE 106.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE controller) 352, and BLUETOOTH' controller 354, and in at least some embodiments, one or more or all of these controllers may be implemented as respective dedicated circuits, for example integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH' controller 354 may communicate with cellular controller 352 over a cell-ISM link, etc. While three separate controllers are illustrated within radio circuitry 330, other embodiments have fewer or more similar controllers for various different RATs that may be implemented in UE device 106. Furthermore, similar to processor(s) 302, the various controllers 356, 352 and 354 may be implemented as a combination of hardware and software, using one or more processing elements (as described above with respect to the various terms used herein).

DRX Communications and Physical Channels

One example of a power saving technique developed to save power in transceiver circuitry is known as discontinuous reception (or DRX). In devices utilizing DRX, portions of wireless circuitry may be powered down if there is no information (e.g., packets) to be received or transmitted. The wireless circuitry may periodically be powered on to determine if there is information to be received, and subsequently powered back down again if such a determination indicates that no new information is incoming. A device utilizing DRX may determine from a header in a transmitted packet if the information contained therein is incoming for that device. If the information is not relevant to that device, then circuitry may be powered down for at least a portion of the remainder of the packet, and subsequently powered on before the next header. Polling is another technique that may be used, wherein a device may periodically send a beacon to an access point or base station to determine if there is any information waiting for reception. If no information is awaiting reception, portions of the wireless circuitry may be powered down until the next beacon is to be transmitted. In addition to determining if information is awaiting reception by the mobile device, neighbor cell searching may be conducted during the time when the wireless circuitry is powered up while operating in a DRX mode. Neighbor cell searching may be performed in order to enable cell reselection and handover of the mobile device from one cell to another.

In general, DRX has been introduced in several wireless standards such as UMTS (Universal Mobile Telecommunications System), LTE (Long-term evolution), WiMAX, etc., which powers down most of user equipment (UE) circuitry when there are no packets to be received or transmitted, and only wakes up at specified times or intervals to listen to the network. DRX can be enabled in different network connection states, including connected mode and idle mode. In connected DRX (C-DRX) mode, the UE listens to the downlink (DL) packets following a specified pattern determined by the base-station (BS). In idle DRX (I-DRX) mode, the UE listens to the page from the BS to determine if it needs to reenter the network and acquire the uplink (UL) timing. Because DRX allows the UE to switch off its transceiver circuitry for short intervals when there is no data to receive or transmit, and start "wake up and sleep" cycles to check whether there is data to send or receive, operating in C-DRX mode helps decrease battery usage.

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Paging-Monitoring

In some cellular communications, e.g. in LTE communications, RNTIs (Radio Network Temporary Identifiers) are used to differentiate/identify a connected mode UE in the cell, a specific radio channel, a group of UEs in case of paging, a group of UEs for which power control is issued by the eNB, system information transmitted for all the UEs by the eNB, etc. There are a several RNTI types in LTE, one of which is Paging RNTI (P-RNTI), which is used by the UEs for the reception of paging. P-RNTI is a common RNTI meaning that it is not allocated to any UE explicitly. A paging message is carried by the PDCCH channel which is mapped to PCH transport channel, which is mapped to the PDSCH channel. The DCI (Downlink Control Information) formats which carry the scheduling information for paging are DCI-1A and DCI-1C in common search space.

Furthermore, a unique International Mobile Subscriber Identity (IMSI) is typically allocated to each mobile subscriber. In order to support the subscriber identity confidentiality service, a Temporary Mobile Subscriber Identity (T-IMSI) may be allocated to visiting mobile subscribers. The VLR (Visitor Location Register), SGSN (Serving General packet radio service Support Node) and MME (Mobile Management Entity) have be capable of correlating an allocated T-IMSI with the IMSI of the UE to which the T-IMSI is allocated.

When in I-DRX mode, the wireless communication device (UE) periodically wakes up to check for paging. When checking for paging, the UE performs the following activities:

Decode the PDCCH
  If a P-RNTI is identified as a result of decoding the PDCCH, then decode the PDSCH
  Check for the UE's T-IMSI in the Page message:
    If no T-IMSI is identified, then enter DRX off-period
    If the T-IMSI is identified, then start RRC connection procedure.

The above sequence may be performed with minimum system resources, i.e. with minimum use of memories, cores, busses, etc. In this context system resources for a specific function/sequence generally refer to any hardware and/or software resource required to perform the specific function/sequence. In case of "No paging", i.e. in case either no P-RNTI and/or no T-IMSI has been detected/identified, the system may continue to operate with the minimum system resources. For example, the decoding of PDCCH takes a specified amount of time, which may be approximately 200 μsec. If no P-RNTI is found for the UE, then the system may enter a "sleep mode" where minimal system resources are used. If a P-RNTI for the UE is found, then it may take approximately another 700 μsec to decode PDSCH. If no T-IMSI for the UE is found, the system may then enter the "sleep mode". However, if it is determined that the UE is being paged (P-RNTI and T-IMSI for the UE have both been identified through the decoding), then the system switches to operating with full system resources. The transition time from minimum resource use to full system resource use has to conform to LTE standard requirements, but those requirements still make further improvements possible. Therefore, utilizing only small part of the system resources in the case of "No Paging" may achieve up to a 70% power saving compared to full system resource use.

It should be noted that "full system resources" in this context refers to all the resources included in the wireless communication device and used for any given operation. For example, referring to FIG. 3, using "full system resources" for conducting cellular wireless communications refers to using all the resources/components/elements included inside UE 106 that are used for conducting all cellular wireless communication operations. As disclosed herein, various paging-monitoring operations may be performed without the use of the full system resources, e.g. by using only a portion of the resources within cellular controller 352 when performing paging-monitoring, e.g. when performing LTE paging-monitoring, as will be further described below.

System Resource Use

Figure 4:
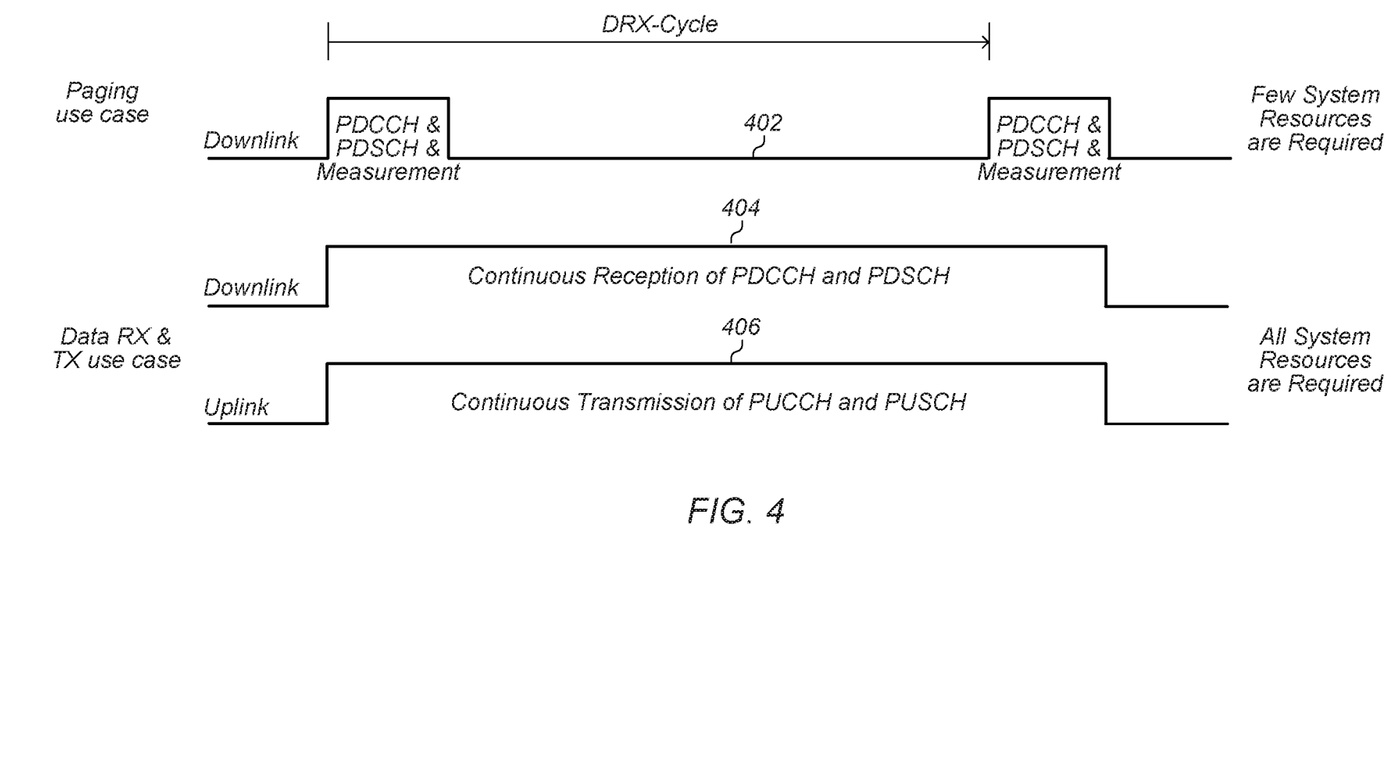
FIG. 4 shows timing diagrams illustrating resource use for paging use-case and data transmission use-case, respectively, according to some embodiments.

FIG. 4 shows a diagram illustrating system resource use during paging-monitoring and during data transmissions, respectively. As shown in FIG. 4 in the paging use case 402, during a DRX cycle the UE receives PDCCH and PDSCH and decodes only the paging message in addition to decoding some measurements, which may include occasionally performing a neighboring cell search and performing measurements on those neighboring cells. These activities may be performed using resources present in what may be designated as a "paging subsystem" (with at least portions of these resources found in cellular controller 352, for example). As indicated in the data RX and data TX use cases 404 and 406, respectively, all the resources of the UE are utilized to perform UL and DL data transfers. As also noted in the Paging-Monitoring section above, these active data transfer activities require the full system resources for active data transmissions. Thus, as indicated in FIG. 4, during paging-monitoring fewer system resources are required while during active data transmissions all system resources are required.

Figure 5:
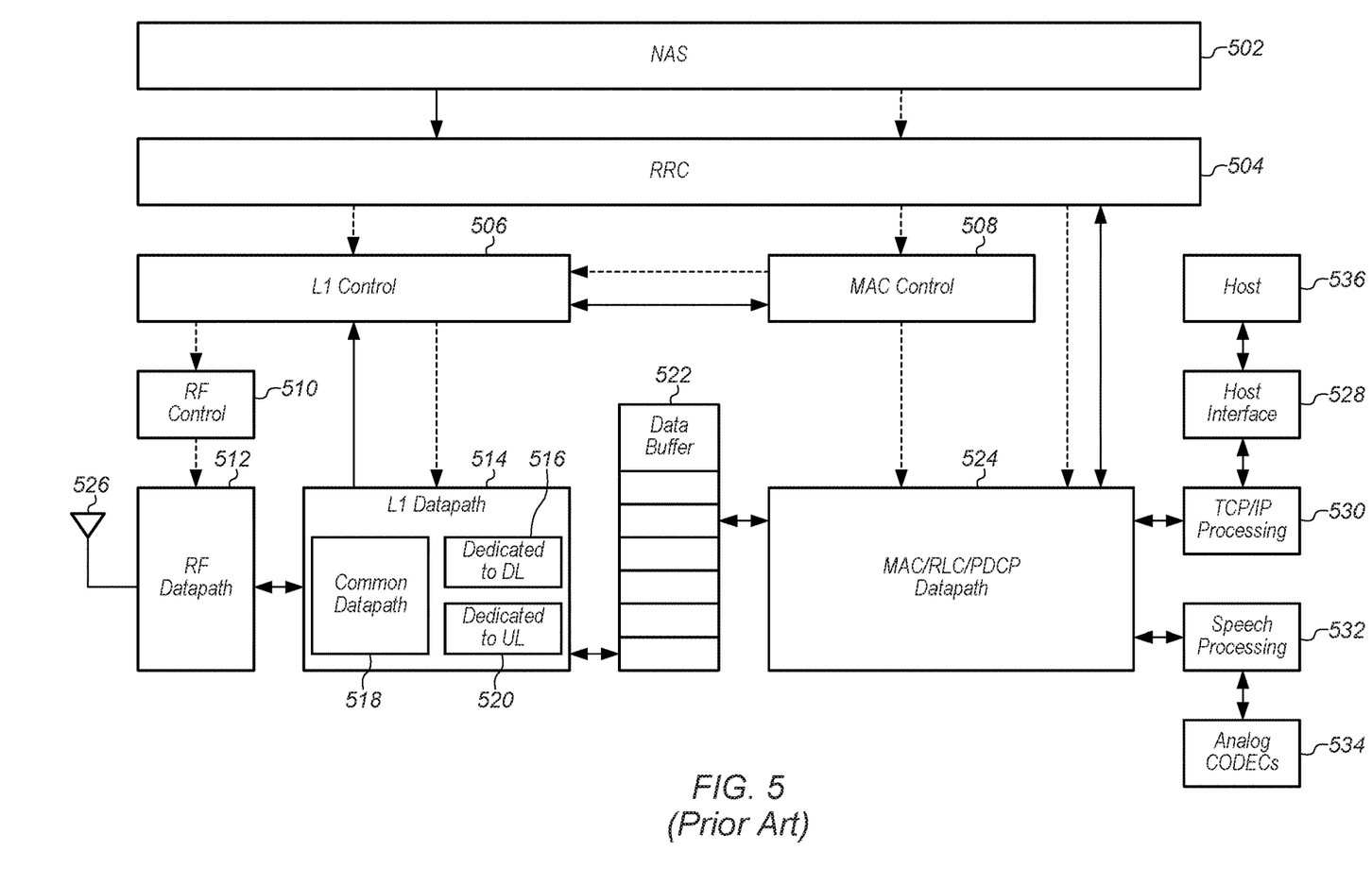
FIG. 5 shows a partial diagram of an exemplary wireless communication device architecture, according to prior art.

FIG. 5 shows the partial block diagram of an exemplary UE architecture, according to prior art. The dashed lines in FIG. 5 represent control signals/signaling buses while the solid lines represent data buses. In addition to previously described components/resources associated with certain cellular wireless communications, the architecture shown in FIG. 5 includes a non-access stratum (NAS) 502, which is a functional layer in the LTE wireless protocol stacks between the core network and user equipment. The NAS 502 is used to manage the establishment of communication sessions and for maintaining continuous communications with the UE as it moves. While components 502, 504, 506, 508, 510, 512, 514, 516, 518, 520, 522, and 526 perform the communication functions, MAC/RRC/PDCP component 524 interfaces with a host 536, which may represent an applications processor, for example (similar to processor(s) 302 in FIG. 3). This interfacing may take place through TCP/IP processing component 530 and host interface 528. MAC/RRC/PDCP component 524 may also interface with Speech processing component 532 which may interface with analog CODECs 534. The present LTE cellular controllers for LTE communications perform the paging and UL/DL data transfer cases (illustrated in FIG. 4) using all the same system resources. In other words, there is no specialized treatment for the paging use case, and all the system components shown in FIG. 5 are involved during paging and/or paging-monitoring as well as during active data transfers.

Nevertheless, when considering the necessary resources for paging/paging-monitoring, specific main paging subsystem components may be identified. Accordingly, the system resources/components used during paging-monitoring may include some elements of L1 data path control 514, the RF data path 512 with RF-Control 510, the dedicated downlink data path 516, and one RRC-ASN1 message parser. ASN-1 (Abstract Syntax Notation One) is a standard notation that describes rules and structures for representing, encoding, transmitting, and decoding data in telecommunications and computer networking. The formal rules enable representation of objects that are independent of machine-specific encoding techniques.

Low-Power Cellular Controller (Modem) Architecture

Figure 6:
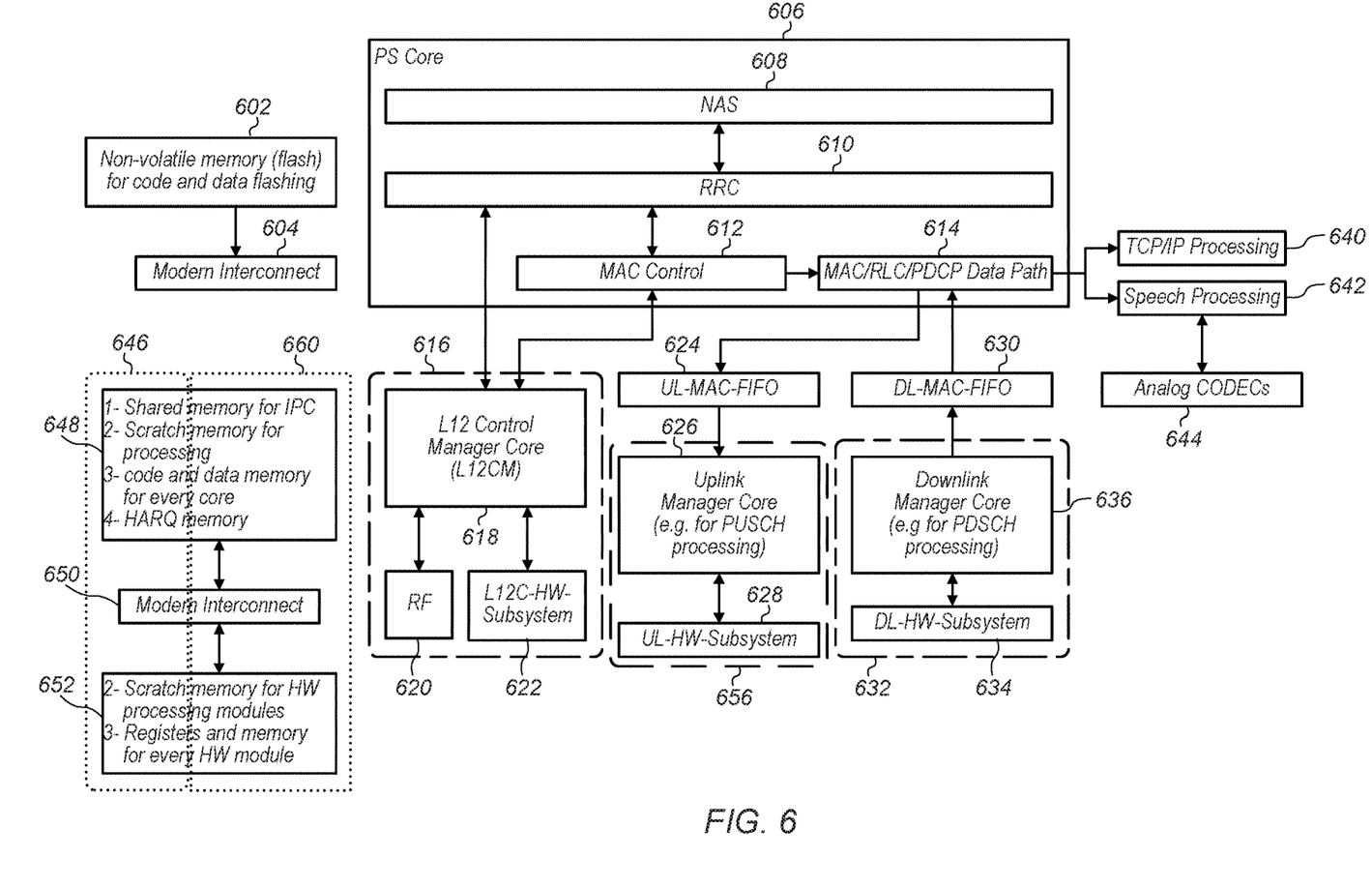
FIG. 6 shows a partial diagram of an exemplary low-power wireless communication device architecture, according to some embodiments.

FIG. 6 illustrates a partial diagram of an exemplary system that includes a low-power cellular controller (or modem) architecture according to some embodiments. As shown in FIG. 6, the low-power cellular controller (LPCC) is divided into three orthogonal domains or modules, these being a control module (control manager module) 616, an uplink module (uplink manager module) 656, and a downlink module (downlink manager module) 632. Each of these modules is delineated by dashed lines. Modules 616, 656 and 632 are orthogonal in the sense that the functionality of each module does not overlap with the functionality of any of the other two modules. The control module 616 may comprise a control core, referred to as the L12 Control Manager Core (L12CM) 618 and associated controller hardware subsystem (L12C-HW-Subsystem) 622, as well as an RF hardware subsystem 620. The uplink manager module 656 may comprise an Uplink Manager Core (ULM) 626 and associated uplink hardware subsystem (UL-HW-Subsystem) 628. The downlink manager module 632 may comprise a Downlink Manager Core (DLM) 636, and associated downlink hardware subsystem (DL-HW-Subsystem) 634. The term "Module" as used herein refers to a collection of one or more processing elements, hardware components, etc. The term "Core" as used herein refers to a "Processing Element" or "Processor" as defined herein. The main functions of L12CM 618 may include decoding the physical downlink control channel (E-PDCCH and M-PDCCH), and routing control information between ULM core 626 and DLM 636 and MAC 612. ULM core 626 may perform all uplink related tasks and DLM core 636 may perform all PDSCH related tasks, i.e. all the tasks that involve the physical downlink shared (data) channel.

As mentioned above, the L12 Control Manager Core (L12CM) 618 is coupled to RF circuitry 620. The RF circuitry is configured for performing RF communications. The controller module (the L12CM) 618 may couple to a Protocol Stack (PS) Core 606, which includes NAS component 608, RRC component 610, MAC control component 612 and data path 614. The uplink manager module 656 may couple through an Uplink Mac FIFO buffer (UL-MAC-FIFO) 624 to the PS Core 606. The downlink manager module 632 may couple through a Downlink Mac FIFO buffer (DL-MAC-FIFO) 630 to the PS Core 606. More specifically, as shown in FIG. 6, data path component 614 is used to provide a data interface between the PS Core 606 and both UL FIFO 624 and DL FIFO 630, and is also used to provide a data interface between PS Core 606 and communications processing component 640 and speech processing component 642 (which interfaces with analog CODECs 644).

As shown in the LPCC architecture of FIG. 6, various cellular controller (modem) resources (such as memory, buses, processors, I/O-interfaces, etc.) have been mapped to various different cellular tasks. Namely, as discussed above, at least a portion of DL resources (632) are orthogonal to at least a portion of UL resources (656), and both of those resources are also orthogonal to control manager resources 616. The orthogonality of the resource blocks allows any one of the resource block to be powered down without affecting the functionality of the other orthogonal resource block. In general, the functionality of the orthogonal resource blocks may remain unaffected when one or more of the orthogonal resource is in a non-operational state, or is placed in a non-operational state, for example by being powered down. In the LPCC architecture shown in FIG. 6, three control resource cores (618, 626 and 636) reside in the PHY (physical layer) and one core is for the protocol stack (PS) 606. As also mentioned above, the PHY cores are controlling three disjoint cellular (e.g. LTE) domains. For example, in some embodiments, functionally L12CM 616 controls/performs measurements, PDCCH decoding, and all LTE signal processing parts, ULM 656 controls/processes all uplink activities, and DLM 632 controls/processes PDSCH. The PHY may include a specified amount of memory, e.g. a total of approximately 6 MB memory. The PS-core 606, which includes both NAS and AS, may be the main contributor to memory usage. In some embodiments it may use approximately 36 MB of memory. As also mentioned above, the modules/components of the paging subsystem include modules/components 616, 632, and 646. The only component not shown is the RRC-ASN1-paging-message parser, which will be further discussed below.

When using a device implementing the LPCC architecture shown in FIG. 6, during cellular operations, e.g. during LTE communications, various cellular, e.g. LTE scenarios and functionalities such as paging, airplane mode, data transfer, etc. may be served by some of the resources while other, unused resources may enter a low-power state, thereby conserving considerable power, extending the battery life of mobile wireless communication devices. A low-power state may involve turning off certain components and/or reducing clocking and/or reducing voltage, etc. Accordingly, the resources required for paging-monitoring include control manager 616, DLM 632, and respective portions of resources 648, 650, and 652 collectively designated in FIG. 6 by dotted rectangle 646. It should also be noted here with reference to resources 648, 650, and 652 that dotted rectangle 660 collectively designates those respective portions of resources 648, 650 and 652 that are not part of the paging subsystem, i.e. those portions of the resources 648, 650 and 652 that are not used/required during paging-monitoring. The mapping of various cellular controller resources to various different cellular tasks—as shown in FIG. 6—allow performing paging operations with greatly reduced system resources. Resources 648 may include shared memory for IPC, scratch memory for processing, code and data memory for each core, and HARQ memory, resources 650 may include modem interconnect, and resources 652 may include scratch memory for hardware processing modules, and registers and memory for each hardware module.

Low-Power Paging-Monitoring without Power-Gating

In one set of embodiments, low-power paging-monitoring, e.g. LP-LTE paging-monitoring may be performed without power-gating, using disjoint physical cellular resources (which may be part of a cellular controller, e.g. cellular controller 352 shown in FIG. 3). Power-gating in this context refers to completely powering down unused system resources. Accordingly, when performing LP-LTE paging-monitoring without power-gating, unused resources are not necessarily powered down or completely turned off. Instead, they may remain in a low-power state.

Referring back to FIG. 6, a one-RRC-ASN1 message parser for the RRC-paging message may be integrated into DLM core 636. When the system enters an IDLE state (e.g. DRX idle state), all the components of the system except the paging subsystem components 646, 616 and 632 may enter a low-power state. In some embodiments, a low-power state means maintaining memory voltages at retention voltage values approximately 50% less than standard operational voltages for the involved memories, and operating the involved processing elements (or cores) at a lowest allowed clock rate, which may be 60% of a designated peak clock rate. In general, low-power state refers to a power state allowing some specified functionality of the powered components with reduced power, e.g. reduced with respect to power provided to those component when targeting higher and/or different performance, e.g. performance that corresponds to normal operational levels. Again, all the components of the system may enter this low-power state except the paging subsystem components 646, 616 and 632, which may operate at normal operational levels.

Figure 8:
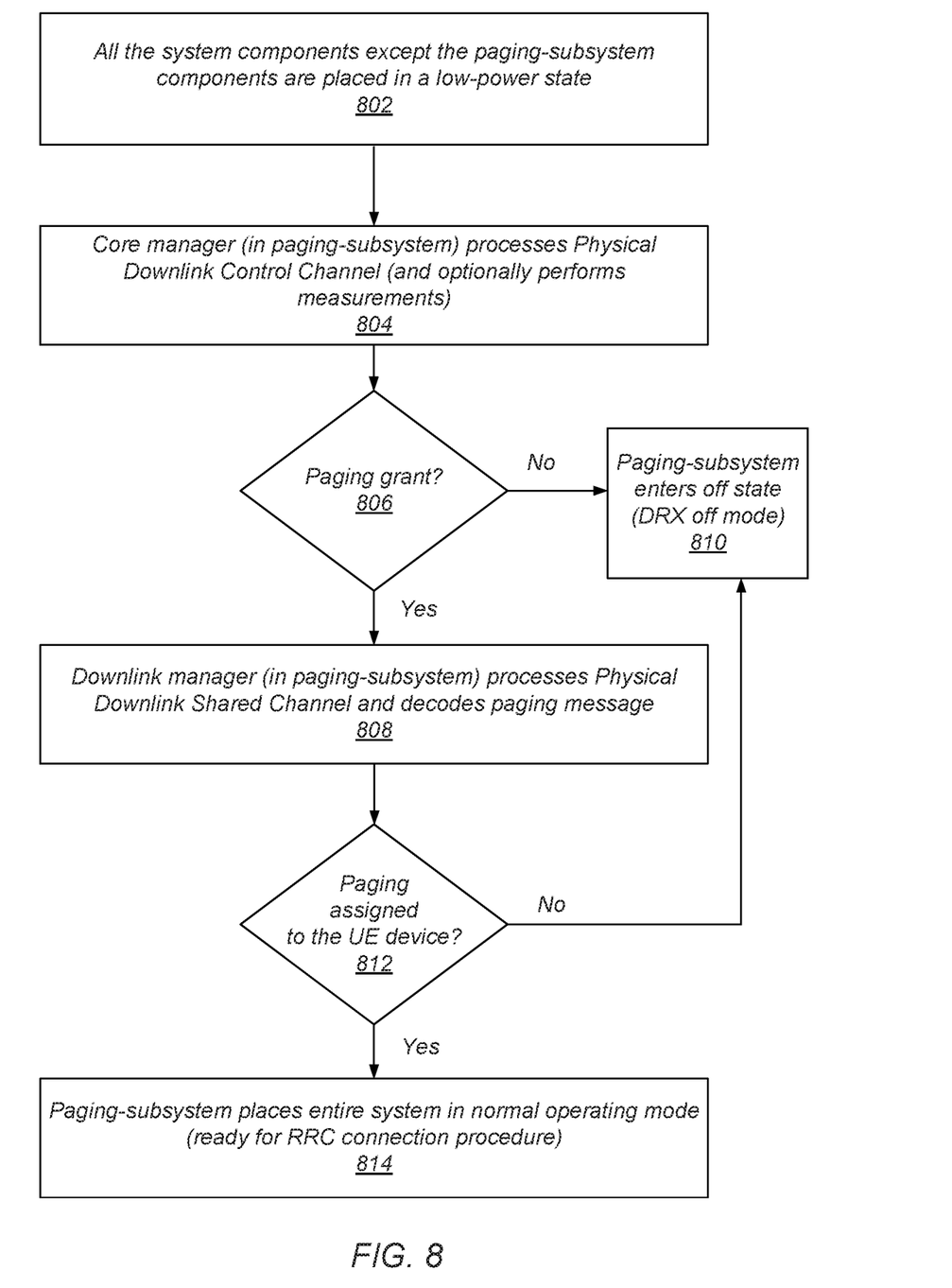
FIG. 8 shows a flow diagram of an exemplary method for performing paging-monitoring without power gating, according to some embodiments.

FIG. 8 shows a flow diagram of an example method for performing paging-monitoring without power-gating, according to some embodiments. When the system enters IDLE state, all the components of the system except the paging subsystem components are placed in a low-power state (802). The paging subsystem then performs the following:

a core manager within the paging subsystem, e.g. L12CM 618 processes PDCCH and optionally performs measurements; e.g. measurements may be occasionally performed but not necessarily on every DRX cycle (804).

If PDCCH indicates there is no P-RNTI grant ("No" branch taken at 806), the paging subsystem enters the DRX off mode (810).

If PDCCH indicates a P-RNTI grant ("Yes" branch taken at 806), a downlink manager within the paging subsystem, e.g. DLM 632 processes PDSCH and decodes the RRC-ASN1 paging message (808).

If there is no paging assigned for the UE ("No" branch taken at 812), i.e. the PDSCH indicates no T-IMSI for the UE, the paging subsystem enters the DRX off mode (810).

If PDSCH contains paging for the UE ("Yes" branch taken at 812), the paging subsystem places the entire system in normal operating mode (leaving low-power mode) to serve the RRC connection procedure which requires all the system to be active (814).

The procedure, as shown in FIG. 8, may be repeated each time the system enters an IDLE state. Performing paging-monitoring/operations as described above may result in conserving a considerable amount of power, e.g. up to 40% of the power that would be consumed during DRX cycles if it were not possible to keep all system components—except those included in the paging subsystem—in low-power mode. This effectively provides a small paging subsystem that serves the paging use-case separately from the data TX and RX use-case.

Low-Power Paging-Monitoring with Power-Gating

In one set of embodiments, low-power paging-monitoring, e.g. LP-LTE paging-monitoring may be performed with power-gating, using disjoint physical cellular resources (which may be part of a cellular controller, e.g. cellular controller 352 shown in FIG. 3). Accordingly, when performing LP-LTE paging-monitoring, unused resources are powered down or completely turned off, instead of remaining in a low-power state.

Figure 7:
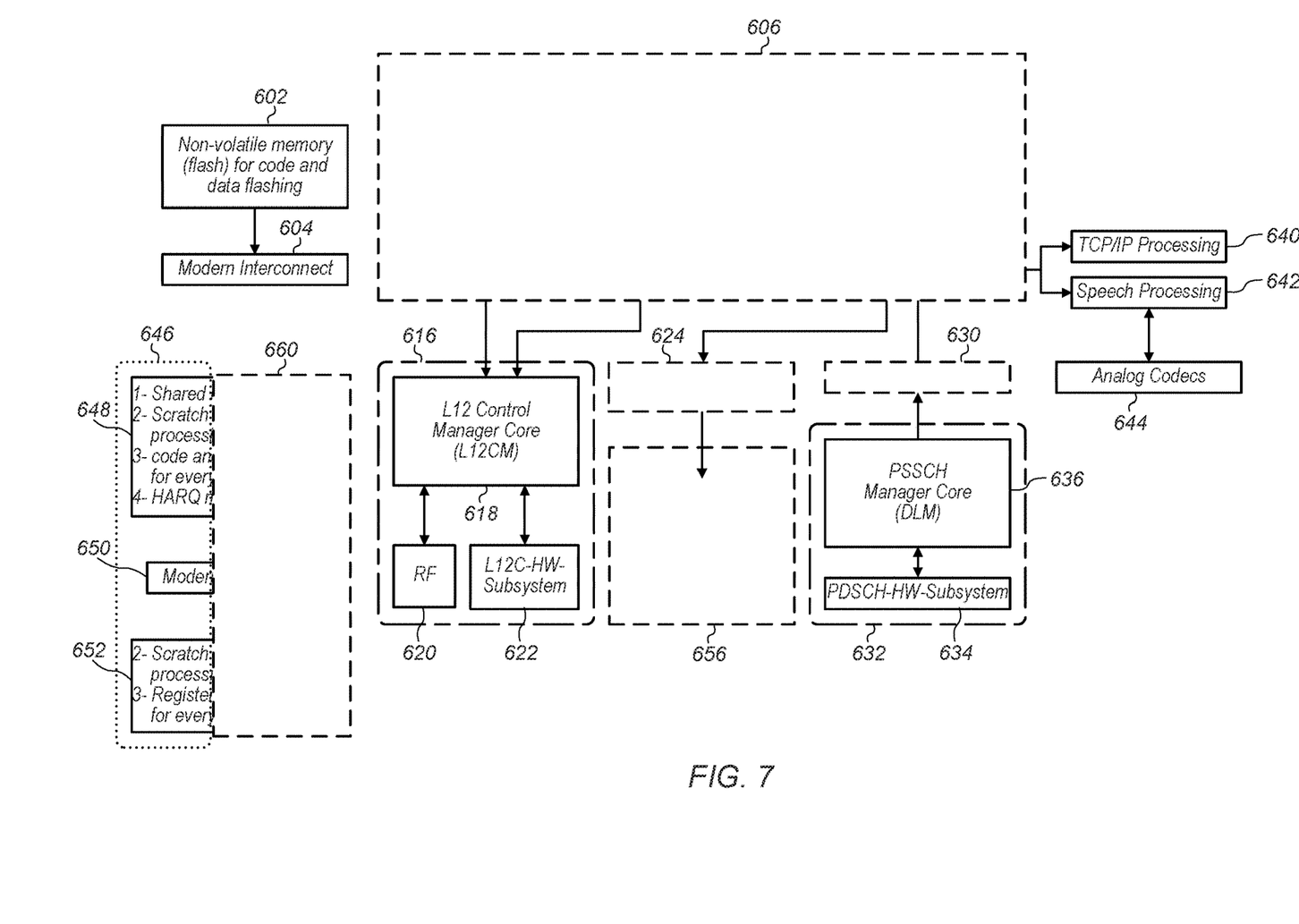
FIG. 7 shows a partial diagram of an exemplary low-power wireless communication device architecture, illustrating system resources unused during paging-monitoring, according to some embodiments.

Referring now to FIG. 7, a one-RRC-ASN1 message parser for the RRC-paging message may be integrated into DLM core 636. When the system enters an IDLE state (e.g. DRX idle state), a present state of the system corresponding to the unused (in paging subsystem) resources 606, 660, 624, 656, and 630 (which are blocked out in FIG. 7 as shown) is saved in non-volatile memory (flash) 602 via modem interconnect 604. The components/resources 606, 660, 624, 656, and 630 may then be power-gated, i.e. they may be powered down. The paging subsystem may then monitor for paging to determine if there is paging for the UE device.

Figure 9:
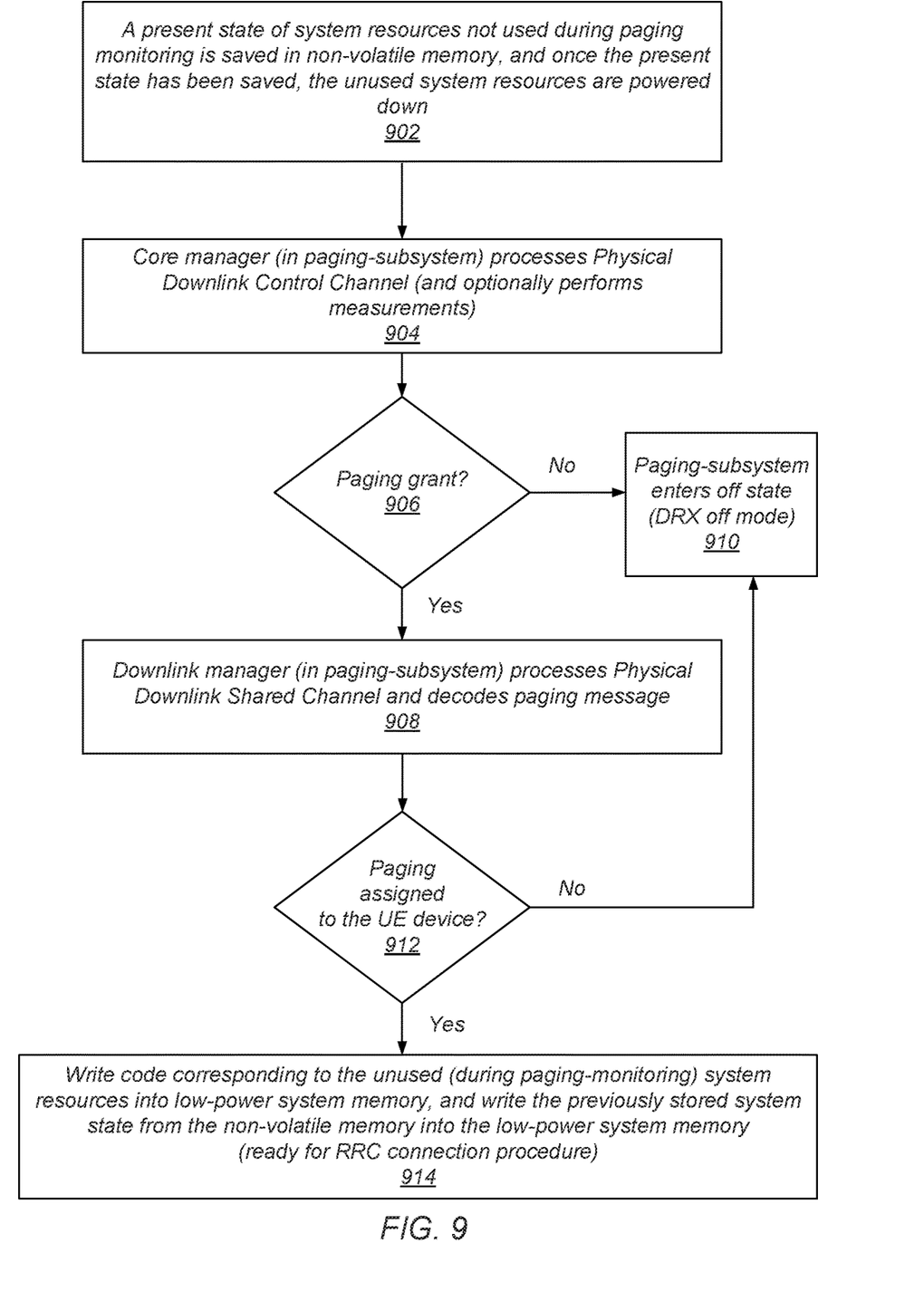
FIG. 9 shows a flow diagram of an exemplary method for performing paging-monitoring with power gating, according to some embodiments.

FIG. 9 shows a flow diagram of one method of performing paging-monitoring with power-gating, according to some embodiments. When the system enters IDLE state, a present state of system resources not used during paging-monitoring is saved in non-volatile memory, and the unused system resources are powered down (902). The paging subsystem (including components 646, 616 and 632) may then perform the following:

a core manager within the paging subsystem, e.g. L12CM 618 processes PDCCH and optionally performs measurements, i.e. measurements may be occasionally performed but not necessarily on every DRX cycle (904).

If PDCCH indicates there is no P-RNTI grant ("No" branch taken at 906), the paging subsystem enters the DRX off mode (910).

If PDCCH indicates a P-RNTI grant ("Yes" branch taken at 906), a downlink manager within the paging subsystem, e.g. DLM 632 processes PDSCH and decodes the RRC-ASN1 paging message (908).

If there is no paging assigned for the UE, i.e. the PDSCH indicates no T-IMSI for the UE ("No" branch taken at 912), the paging subsystem enters the DRX off mode (910).

If PDSCH contains paging for the UE ("Yes" branch taken at 912), the paging subsystem flashes (writes) code corresponding to components/resources 606, 660, 624, 656, and 630 into a low-power system memory (which may be a low-power DDR memory), and flashes (writes) the previously stored system state (which was stored in non-volatile memory 602) into the low-power system memory from non-volatile memory 602 (914).

Subsequently, the system may begin the attach procedure to respond to the paging request. The procedure as shown in FIG. 9 may be repeated each time the system enters an IDLE state. Performing paging operations as described above may result in conserving a considerable amount of power, e.g. conserving up to 80% of the power that would be consumed during DRX cycles if it were not possible to power-gate system components/resources 606, 660, 624, 656, and 630. This may especially be beneficial in the case of small form-factor technologies, e.g. 14 nm technologies where memory use accounts for a large portion of the power used.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
   a processor configured to cause a device to:
   save state information representative of a present state of first system resources of the device into non-volatile memory, wherein the first system resources of the device are not used by the device during monitoring for paging performed by the device;
   perform the monitoring for paging; and
   write the saved state information from the non-volatile memory into a system memory of the device in response to detecting, during the monitoring for paging, a paging assigned to the device.

2. The apparatus of claim 1, wherein the processor is configured to further cause the device to:
   power down the first system resources once the state information has been saved into the non-volatile memory.

3. The apparatus of claim 1, wherein the processor is configured to further cause the device to:
   write additional information corresponding to the first system resources into the system memory of the device in response to detecting the paging assigned to the device.

4. The apparatus of claim 1, wherein the processor is configured to further cause the device to:
   process a physical control channel as part of the monitoring for paging to detect a paging grant.

5. The apparatus of claim 4, wherein the processor is configured to further cause the device to:
   process a physical data channel in response to detecting the paging grant detect a paging message corresponding to the paging grant; and
   decode the paging message to detect the paging assigned to the device.

6. The apparatus of claim 5, wherein the physical control channel includes a physical downlink control channel and the physical data channel includes a physical downlink shared channel.

7. The apparatus of claim 1, wherein the processor is configured to further cause the device to:
perform measurements during the monitoring for paging.

8. The apparatus of claim 1, wherein the processor is configured to further cause the device to:
place system resources used for the monitoring for paging into an off state in response to the monitoring for paging indicating that there is no paging assigned to the device.

9. A device, comprising:
radio circuitry for facilitating wireless communications of the device; and
a processor communicatively coupled to the radio circuitry and configured to cause the device to:
save state information representative of a present state of first system resources of the device into non-volatile memory, wherein the first system resources of the device are not used by the device during monitoring for paging performed by the device;
perform the monitoring for paging; and
write the saved state information from the non-volatile memory into a system memory of the device in response to detecting, during the monitoring for paging, a paging assigned to the device.

10. The device of claim 9, wherein the processor is configured to further cause the device to:
power down the first system resources once the state information has been saved into the non-volatile memory.

11. The device of claim 9, wherein the processor is configured to further cause the device to:
write additional information corresponding to the first system resources into the system memory of the device in response to detecting the paging assigned to the device.

12. The device of claim 9, wherein the processor is configured to further cause the device to:
process a physical control channel as part of the monitoring for paging to detect a paging grant;
process a physical data channel in response to detecting the paging grant to detect a paging message corresponding to the paging grant; and
decode the paging message to detect the paging assigned to the device.

13. The device of claim 9, wherein the processor is configured to further cause the device to:
perform measurements during the monitoring for paging.

14. The device of claim 9, the processor is configured to further cause the device to:
perform an attach procedure to a wireless network subsequent to writing the saved state information into the system memory, to respond to the paging assigned to the device.

15. A non-transitory memory element storing programming instructions executable by a processor to cause a device to:
save state information representative of a present state of first system resources of the device into non-volatile memory, wherein the first system resources are not used during monitoring for paging performed by the device;
perform the monitoring for paging; and
write the saved state information from the non-volatile memory into a system memory of the device in response to detecting, during the monitoring for paging, a paging assigned to the device.

16. The non-transitory memory element of claim 15, wherein the programming instructions are executable by the processor to further cause the device to:
power down the first system resources once the state information has been saved into the non-volatile memory.

17. The non-transitory memory element of claim 16, wherein the programming instructions are executable by the processor to further cause the device to:
write additional information corresponding to the first system resources into the system memory of the device in response to detecting the paging assigned to the device.

18. The non-transitory memory element of claim 16, wherein the programming instructions are executable by the processor to further cause the device to:
process a physical control channel as part of the monitoring for paging to detect a paging grant;
process a physical data channel in response to detecting the paging grant to detect a paging message corresponding to the paging grant; and
decode the paging message to detect the paging assigned to the device.

19. The non-transitory memory element of claim 15, wherein the programming instructions are executable by the processor to further cause the device to:
perform measurements during the monitoring for paging.

20. The non-transitory memory element of claim 19, wherein the programming instructions are executable by the processor to further cause the device to:
perform an attach procedure to a wireless network subsequent to writing the saved state information into the system memory, to respond to the paging assigned to the device.

* * * * *